United States Patent Office 3,282,067
Patented Nov. 1, 1966

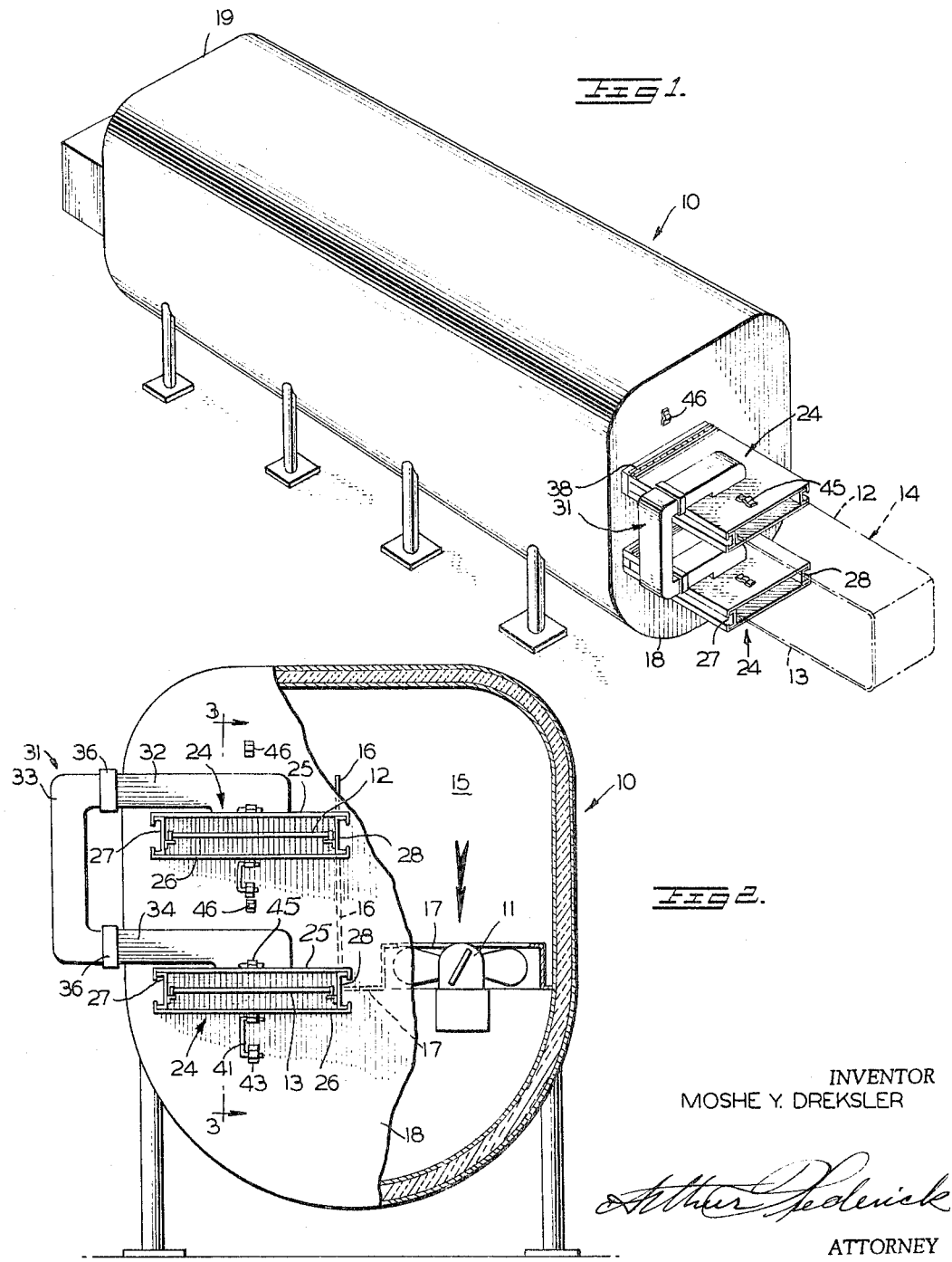

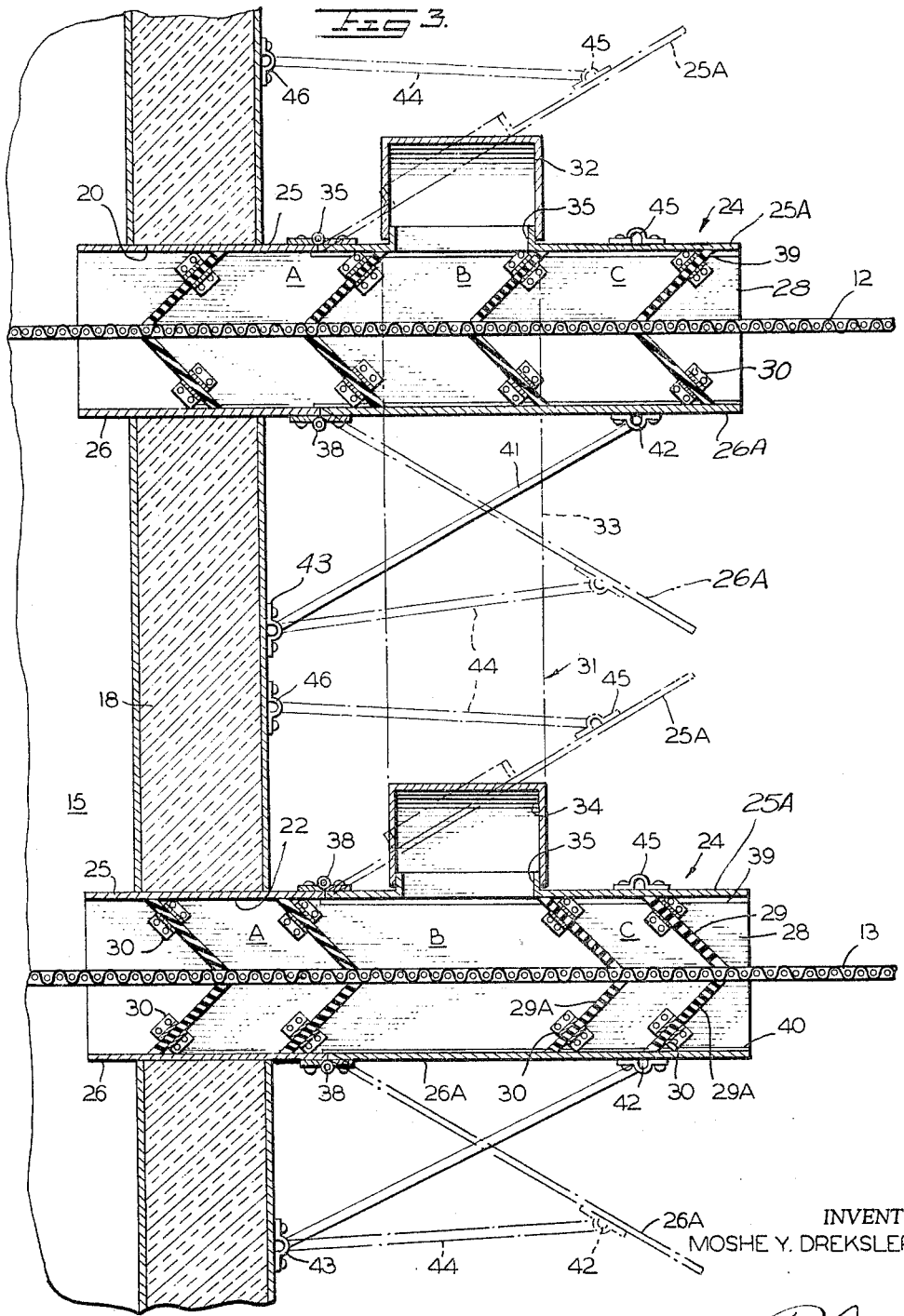

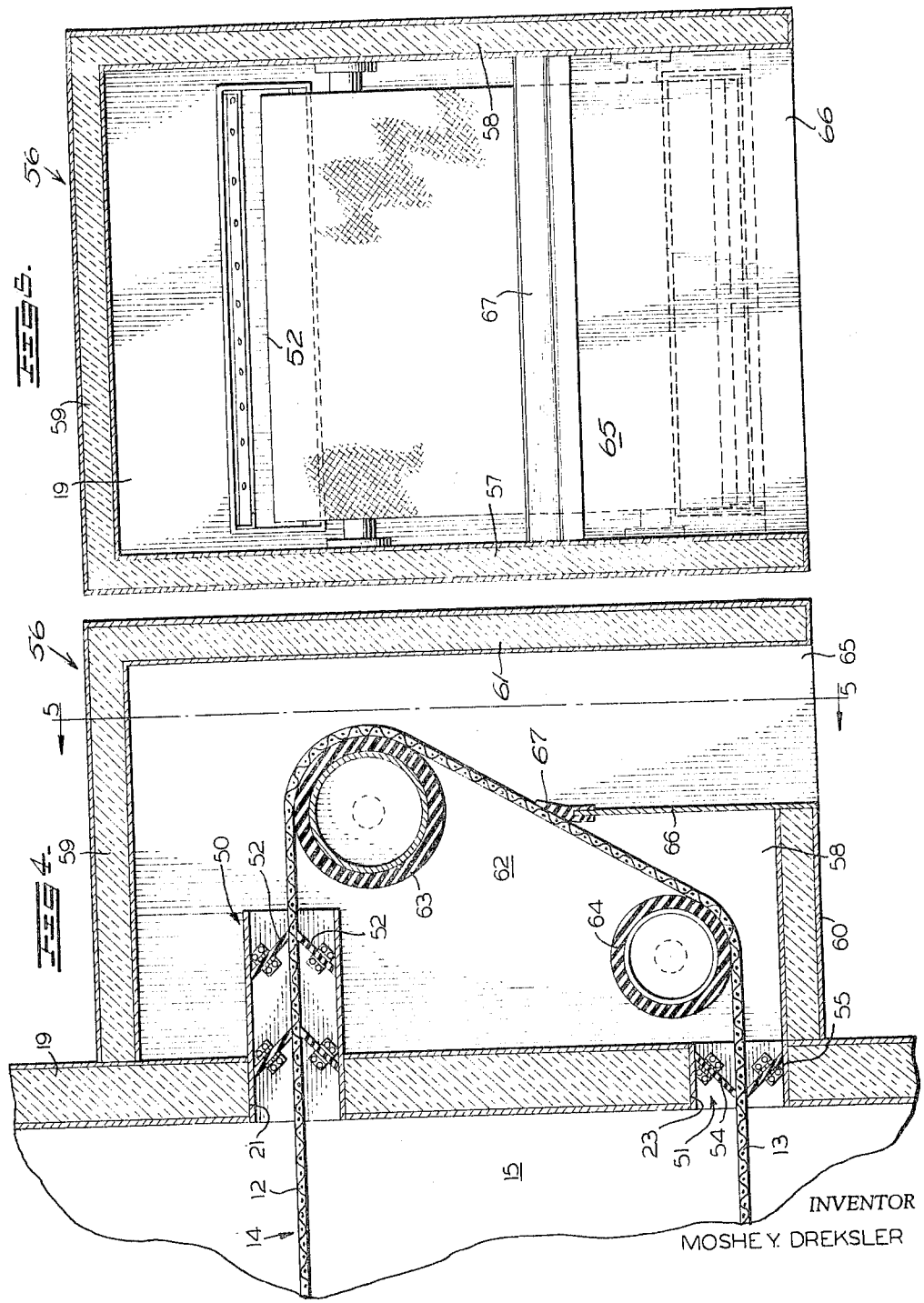

3,282,067
SEALING MEANS FOR CONVEYOR PORTS OF A MATERIAL TREATMENT CHAMBER
Moshe Y. Dreksler, Waynesboro, Pa., assignor to Frick Company, Waynesboro, Pa., a corporation of Pennsylvania
Filed Apr. 1, 1965, Ser. No. 444,620
10 Claims. (Cl. 62—266)

This invention relates to sealing means and more particularly to air sealing means for the conveyor ports in walls of a material treatment chamber, such as tunnel type freezing apparatuses or the like.

In freezing chambers wherein material to be frozen is carried continuously into and from the chamber on an endless conveyor belt, it is necessary to provide as air tight a seal as possible around the ports through which the conveyor belt passes. Such seals are necessary since the moisture in the relatively warm ambient air, upon entry of such air into the freezing chamber, rapidly solidifies in the form of frost on the interior surfaces of the freezing chamber, particularly the evaporator coils of the refrigerating apparatus. The rapid accumulation of frost on the interior surfaces of the freezing chamber has an adverse effect upon the heat transfer efficiency of the evaporator coils and requires relatively frequent shutdowns of the freezing chamber for defrosting. Obviously, the elimination of the entry of warm, moist, ambient air into a freezing chamber would increase its efficiency by providing a longer operative life between shutdown periods for defrosting. This problem of the entry of ambient air into the freezing chamber is particularly pronounced in tunnel type freezing apparatuses, commonly called tunnel freezers, such as shown in the U.S. Patents No. 2,223,972 and No. 3,115,756, wherein the upper course of the foraminous conveyor belt carries material to be frozen into and through the freezing chamber or chambers and fans are employed to circulate air within the chamber in a direction such as to cause the air to pass upwardly through the upper course of the belt. This circulation of air develops within the chamber a higher pressure adjacent the lower port for the return course of the conveyor belt than adjacent the upper port for the delivery course of the conveyor belt because of the pressure drop caused by the resistance of the passage of air offered by the return course of the conveyor belt and the evaporator coils. Not only is the air pressure within the chamber adjacent the port for the return course of the conveyor higher than the air pressure adjacent the supply course of the conveyor, but it is also higher than the ambient air pressure externally of the chamber. The internal air pressure adjacent the upper port for the delivery course of the conveyor belt is less than the ambient air pressure externally of the chamber. Manifestly, the differential air pressures adjacent the ports for the delivery and return courses of the conveyor belt creates a flow of air from the freezing chamber through the lower port for the return course and air flow into the chamber through the upper port for the delivery course of the conveyor.

Heretofore, the problem of ambient air flow into the freezing chamber has been at least partially solved by providing anterooms with or without dehumidifying devices therein around the conveyor belt ports. However, the disadvantage of the anteroom construction is that it is expensive and requires additional floor space.

Accordingly, it is one of the objects of this invention to provide an air seal means for the conveyor ports of a freezing chamber, which means is relatively inexpensive and effectively minimizes air infiltration into the chamber.

Another object of the present invention is to provide an air seal means for the conveyor ports of a freezing chamber, which means is readily accessible interiorly for cleaning.

A further object of this invention is to provide an air seal means for conveyor ports of a freezing chamber which increases the efficiency of the freezing chamber.

In view of the foregoing, the present invention contemplates a novel sealing means for conveyor belt ports of a freezing chamber, which means comprises an elongated duct lining each of the openings in the freezing chamber wall and extending therefrom, and a plurality of spaced flexible walls supported within the duct to engage the conveyor belt. At least one wall of the duct is removable to permit access to the interior of the duct for purposes of inspection and cleaning.

To provide a still more effective sealing means, the apparatus also includes means forming a passageway for communicating one of the air lock chambers or compartments formed between adjacent flexible walls of the duct of the lower conveyor belt port with one of the air lock chambers or compartments formed between adjacent flexible walls of the duct of the upper conveyor belt port. This passage means provides for conducting relatively high pressure air from at least one of the air lock chambers of the lower conveyor belt port to at least one of the air lock chambers of the upper conveyor belt port so that air pressures in the upper and lower chambers are closer to the air pressure exteriorly of the freezing chamber. This balancing of pressures within the seal means assists in preventing leakage of refrigerated air from the freezing chamber and infiltration of ambient, moist air into the freezing chamber.

The invention will be more fully understood from the foregoing description when considered in connection with the accompanying drawings in which:

FIG. 1 is a perspective view of a tunnel freezer having seal means for the conveyor belt ports according to the present invention;

FIG. 2 is a view in end elevation of the supply end of the tunnel freezer shown in FIG. 1 with parts broken away for illustrative purposes;

FIG. 3 is a sectional view on an enlarged scale taken substantially along line 3—3 of FIG. 2;

FIG. 4 is a longitudinal view in section of the delivery end of the tunnel freezer shown in FIG. 1, and FIG. 5 is a cross-sectional view taken substantially along line 5—5 of FIG. 4.

While the present invention will be shown and described with respect to a tunnel freezer, it is not limited in application to that type of freezer. This invention has application to any type of chamber having upper and lower conveyor belt ports and wherein air pressure in the chamber adjacent one port is greater than ambient air pressure and the internal air pressure adjacent the other port is less than the ambient air pressure, without departing from the scope and spirit of the invention.

Now referring to the drawings and particularly FIGS. 1 and 2, the reference numeral 10 generally designates a tunnel freezer in which is disposed a plurality of air circulating fans 11 (one of which is shown in FIG. 2) and suitable refrigerating equipment including evaporator coils (not shown) disposed between the upper delivery course 12 and return or lower course 13 of a foraminous conveyor belt 14. Fans 11 provide for circulation of refrigerated air within the tunnel freezer chamber 15 in the direction of the arrow, as shown in FIG. 2. The tunnel freezer 10 has a longitudinally extending, vertical partition 16 disposed in the interior of the tunnel freezer and spaced from the bottom and top walls of tunnel freezer 10. A floor 17 in which fans 11 are mounted extends from partition 16 to the outer side wall of the tunnel freezer and the length of the tunnel freezer from supply end wall 18 to delivery end wall 19 (see FIG. 4).

Conveyor belt 14 is driven by any suitable means (not shown) so that upper delivery course 12 carries material to be frozen into and through chamber 15 and the return or lower course 13 passes back through chamber 15 to again receive additional material to be frozen and carry the same through the chamber. Delivery course 12 extends into chamber 15 through upper openings or ports 20 and 21 disposed in the upper part of end walls 18 and 19, respectively, while return course 13 projects through lower openings or ports 22 and 23 in end walls 18 and 19, respectively. To prevent flow of air into the upper ports 20 and 21 and out of the lower ports 22 and 23, the present invention provides seal means as hereinafter described.

As best shown in FIGS. 1, 2, and 3, each of the means for sealing the upper port 20 and lower port 22 in end wall 18 comprises an elongated duct 24 having a top wall 25, bottom wall 26 and opposite side walls 27 and 28. Duct 24 is secured in a fluid tight manner within its associated port by any suitable means, as for example, by welding. Two sets of spaced flexible walls are disposed in duct 24, one set of flexible walls 29 being constructed and arranged to engage the upper surface of the conveyor belt, with the other set of flexible walls 29A being constructed to engage the under surface of the conveyor belt at corresponding points of contact. Each of the flexible walls 29 and 29A is constructed of a plurality of adjacent fingers (see FIG. 1) which may be formed by a plurality of spaced, parallel slits cut in a sheet of flexible material such as rubber or resilient plastic material. The sheet is clamped between two mounting strips 30 disposed on opposite sides of the sheet. Each of the strips 30 is provided with flanged end portions by which the sheet is secured to side walls 27 and 28 of duct 24. The mounting strips 30 are spaced from the opposite longitudinal edges of the sheets so that the opposite longitudinal edges of the sheet sealingly engage the top and bottom walls 25 and 26 as well as the surfaces of the conveyor belt and/or the material carried on the delivery course 12. The flexible walls 29 and 29A define within the duct and between next adjacent flexible walls 29 and 29A a plurality of compartments or air locks. As shown in FIG. 3, flexible walls 29 and 29A form three compartments designated A, B and C.

To provide a more effective seal of openings 20 and 22 than is achieved by the flexible walls 29 and 29A, the present invention contemplates, a fluid sealing means which comprises conduit means communicating one of the compartments A, B and C of the lower duct 24 with one of the compartments A, B and C of the upper duct 24. As shown in FIGS. 1, 2 and 3, the conduit means comprises a U-shaped duct 31 which consists of three detachable sections 32, 33 and 34. As illustrated in FIG. 3, each of the top walls 25 of the upper and lower ducts 24 is provided with an opening 35 which communicates with compartment B. Opening 35 is defined by upstanding flanges and has a configuration corresponding to the ends of duct sections 32 and 34 to slideably receive the end of duct sections 32 and 34. The opposite or distal ends of each of the sections 32 and 34 are detachably secured at 36 in any suitable manner well known to those skilled in the duct art to the opposite ends of duct section 33 (see FIG. 2). Duct 31 functions to balance the air pressures in compartments B of the upper and lower ducts 24 by conducting the air which tends to be at a higher pressure than ambient air pressure from the lower compartment B to the upper compartment B, the air pressure of the latter compartment tending to be less than that in lower compartment B and the ambient air pressure.

The substantial balancing of air pressures in compartments B of both of the ducts has a dual effect. The first and primary effect is to increase the pressure in the upper compartment B which normally would be slightly less than ambient air pressure surrounding the tunnel freezer 10 to a point substantially equal to the ambient air pressure. This increase in pressure will substantially resist or block the flow of ambient air into chamber 15 of tunnel freezer 10. The leakage of air from upper compartment B into compartment A and thence into chamber 15 of tunnel freezer 10 is not objectionable since this air is treated or dehumidified air that is being returned to the interior of the tunnel freezer. The second effect is to reduce the loss of treated or conditioned air in lower compartment B, which is at a higher pressure than ambient air pressure, by the recycling of at least a portion thereof through the duct 31 back into chamber 15 of the tunnel freezer.

In apparatuses intended to treat food, it is essential that such apparatuses be capable of being cleaned to prevent contamination of subsequent food being treated by spoiled particles of food which was previously treated. Accordingly, each of the ducts 24 has been provided with a pivotally mounted top portion 25A and a pivotally connected bottom portion 26A so that those portions may be swung away from sides 27 and 28 and conveyor course 12 or 13 to facilitate cleaning of duct 24 and flexible walls 29 and 29A. As best shown in FIGS. 1 and 3, top wall portion 25A and bottom wall portion 26A are each pivotally connected to the fixed portions of the top and bottom walls by means of a hinge 38. To seal the space between the abutting surfaces of top wall portion 25A and side walls 27 and 28 when in the closed position, a gasket 39 of some suitable resilient material is interposed between those surfaces. In a similar manner, a gasket 40 is interposed between the bottom wall portion 26A and side walls 27 and 28.

To retain bottom wall portion 26A of each duct 24 in a closed or in abutting relationship with side walls 27 and 28, any suitable latch means may be provided in the assembly. As shown, the latch means may comprise a rigid bar 41 having "hooked" end portions adapted to engage an eyelet 42 secured to bottom wall portion 26A and an eyelet 43 secured to end wall 18 of the tunnel freezer. The bar 41 is of a length to hold bottom portion 26A in tight abutment against gasket 40 when connected to eyelets 42 and 43. To allow bottom portion 26A to swing downwardly away from side walls 27 and 28, bar 41 is merely disengaged from eyelets 42 and 43. If it is desired to hold bottom portion 26A in a fixed open position, a bar 44 similar to bar 41 but of shorter length, may be inserted in eyelets 42 and 43 as shown in dot-dash lines in FIG. 3. Similarly, to hold top wall portions 25A in an open position, another bar 44 may be made to engage an eyelet 45 secured to top wall portion 25A and an eyelet 46 secured to tunnel freezer end wall 18. Top wall portions 25A are held in tight abutment against gasket 39 by duct 31. To permit top portions 25A to be swung to an open position, it is necessary to first disconnect and remove duct 31.

The balancing duct 31 is preferably formed of 3 sections to facilitate disconnection from ducts 24, removal and cleaning thereof. Thus, the entire sealing means may be readily and easily cleaned and maintained in a sanitary condition.

If the conveyor 14, as shown in the drawings, extends through ports 21 and 22 in end wall 19 of tunnel freezer 10, a duct 50 may be secured in opening 21 while a smaller size duct 51 lines opening 23. Duct 50 is provided with two sets of flexible walls, each set consisting of the spaced flexible walls 52 and 53 (similar to flexible walls 29 and 29A of ducts 24). Duct 51 also has two or more sets of flexible walls consisting of one or more flexible walls 54 and 55 in each set. Flexible walls 52, 53, 54 and 55 are of the same construction as flexible walls 29 and 29A and are secured in their associated ducts in the same manner as flexible walls 29 and 29A are secured in ducts 24.

A housing 56, comprising opposite side walls 57 and 58, a top wall 59, a bottom wall 60, and an end wall 61, is secured to end wall 19 of tunnel freezer 10 to define with end wall 19 a chamber 62 enclosing ducts 50 and 51. The walls of housing 56 are provided with removable closures (not shown) for access openings (not shown), which openings permit easy cleaning of chamber 62. Two rollers 63 and 64 are supported in chamber 62 by side walls 57 and 58 to effect a change in direction of movement of conveyor belt 14. To provide for discharge of frozen material from conveyor 14, bottom wall 60 is spaced from end wall 61 to define with the latter a product outlet 65. The product is guided to and through outlet 65 by a chute formed by a wall or baffle 66 which extends normal to bottom wall 60 and parallel to end wall 61. Baffle 66 is provided with a flexible end edge portion 67 which rides against the surface of conveyor belt 14 to minimize escape of treated or refrigerated air from chamber 62 through product outlet 65 and insure removal of all product from the conveyor belt surface that might adhere to the latter. Baffle 66 also partially forms with end wall 19 and side walls 57, conveyor belt and roller 63, a balancing duct or passage means for communicating duct 51 with duct 50. By bringing duct 51 into communication with duct 50, infiltration of ambient air through product outlet 65 and duct 50 is minimized and, at least, part of the leakage of air into chamber 15 of tunnel freezer 10 is dehumidified air which has escaped through duct 51. Air leakage may be further minimized by disposing a star-shaped gate valve (not shown) in product outlet 65.

It is now believed readily apparent that the present invention provides a novel sealing means for conveyor ports in walls of freezing chambers in which escape of treated or refrigerated air from the chamber is reduced and infiltration of warm, moist, ambient air is substantially minimized. It is a sealing means which substantially increases the operative duration of the freezing chamber between defrosting shut-down periods so that the apparatus achieves increased productivity. In addition, the heat exchange efficiency of the evaporation coils within the freezing chamber is maintained over a longer period of operation than heretofore similar apparatuses.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art. For example, balancing duct 31 may be constructed and arranged to communicate with the desired compartments of each of the ducts 24 through an opening in either of the side walls 27 and 28 of ducts 24. Also, two ducts 31, each of which may communicate with the respective compartments of ducts 24 through each side wall 27 and 28. These obvious mechanical equivalents may be employed without departure from the scope and spirit of this invention.

What is claimed is:

1. In combination with a chamber having vertically spaced ports in the walls thereof through which a conveyor belt extends and wherein air pressure within the chamber adjacent a lower port is different from the air pressure adjacent an upper port, a sealing means for such ports comprising mechanical seal means consisting of a plurality of flexible walls disposed within the ports in spaced relationship to each other and engaging the conveyor belt to form at least one compartment within each of said ports, and conduit means for communicating each of said compartments to tend to equalize the pressure in the compartments of the vertically spaced ports.

2. A sealing means for two spaced ports in the walls forming a freezing chamber in which fluid pressure adjacent the ports is different and through which ports a conveyor belt extends, the sealing means comprising (a) plurality of flexible walls disposed within each of the ports to engage the conveyor and the walls defining the port;

(b) said flexible walls extending transversely of the conveyor belt and spaced from each other to form at least one compartment therebetween in each port, and (c) conduit means for communicating the compartment of one port with the compartment of the other port so as to provide air flow from one compartment to the other and thereby tend to equalize the pressures in the compartments.

3. A sealing means for ports spaced one above the other in the walls forming a freezing chamber and through which ports a conveyor belt extends, the sealing means comprising (a) an elongated duct lining each of said ports, (b) a plurality of flexible walls disposed in each of said ducts so as to engage the conveyor and the duct, (c) said flexible walls extending transversely of the conveyor belt and spaced from each other to form at least one compartment therebetween in each of said ducts, and (d) conduit means detachably connected to said ducts and communicating with said compartment of one duct with the said compartment of the other duct to provide fluid flow from one compartment to the other, (e) said conduit means comprising a plurality of detachably connected sections to permit said conduit means to be readily inspected and cleaned.

4. A sealing means for ports spaced one above the other in the walls forming a freezing chamber and through which ports a course of a foraminous conveyor belt extends, the sealing means comprising (a) an elongated duct secured within each of said ports, (b) a plurality of spaced first flexible walls disposed transversely of the conveyor belt course in each of said ducts on one side of the conveyor belt course so as to engage the surface of the conveyor belt, (c) a plurality of spaced second flexible walls disposed in each of said ducts on the opposite side of the conveyor belt course so as to engage the opposite surface of the conveyor, (d) said first and second flexible walls of each duct defining therebetween and with the associated duct at least one compartment, and (e) conduit means interconnecting the compartments of each of said ducts so that the fluid pressure in each of said compartments is substantially the same.

5. The apparatus of claim 4 wherein each of said ducts is provided with access means to permit entry into each of said ducts for purposes of cleaning the interior surfaces of the duct and the first and second flexible walls.

6. A sealing means for ports spaced one above the other in the walls forming a freezing chamber and through which ports a course of a foraminous conveyor belt extends, the sealing means comprising (a) an elongated duct secured within each of said ports, (b) each duct having contiguous opposite side walls and top and bottom walls with the course of the conveyor belt extending through the associated duct in spaced, substantially parallel relationship with the top and bottom walls, (c) a plurality of spaced first flexible walls disposed within each of said ducts transversely of the conveyor belt course on one side of the conveyor belt course so as to engage the duct and the surface of the conveyor belt course, (d) a plurality of spaced, second flexible walls disposed in each of said ducts on the opposite side of the conveyor belt course so as to engage the opposite surface of the conveyor belt course from said first flexible walls,
(e) said first and second flexible walls defining therebetween and with the walls of the associated duct at least one compartment,
(f) conduit means interconnecting the ducts and in communication with each compartment of the ducts so that the fluid pressure in each of said compartments tends to be substantially the same, and
(g) access means in said top and bottom of each of said ducts to permit entry into the interior of each duct for inspection, repair and cleaning of the duct and said first and second flexible walls.

7. The apparatus of claim 6 wherein said access means comprises a portion of said top and bottom walls which is pivotally mounted for movement toward and away from the opposite side walls of the ducts.

8. The apparatus of claim 6 wherein said conduit means comprises duct sections detachably secured to each other and to said ducts.

9. A sealing means for ports spaced one above the other in the walls forming a freezing chamber and through which ports a course of a foraminous conveyor belt extends, the sealing means comprising
(a) an elongated duct secured within each of said ports,
(b) each duct having contiguous opposite side and top and bottom walls with the course of the conveyor belt extending through the associated duct in spaced, substantially parallel relationship with the top and bottom walls,
(c) a plurality of spaced, first flexible walls disposed within each of the ducts to extend on one side of and transversely of the conveyor belt course so as to engage the duct and the surface of the conveyor belt course,
(d) a plurality of spaced, second flexible walls disposed within each of the ducts on the opposite side of the conveyor belt course, from said first flexible walls and in juxtaposition to the latter and in engagement with the duct and the surface of the conveyor belt course,
(e) said first and second flexible walls defining therebetween and with the walls of the associated duct at least one compartment,
(f) conduit means interconnecting the ducts and in communication with each compartment of the ducts so that the fluid pressure in each of said compartments tends to be substantially the same, and
(g) said top and bottom walls of each of said ducts having a fixed portion and a pivotal portion connected to the fixed portion for movement toward and away from the opposite side walls of the associated duct to permit access to the interior thereof for cleaning, inspection or repair.

10. The apparatus of claim 9 wherein said conduit means comprises a plurality of sections detachably connected to each other and the ducts.

References Cited by the Examiner
UNITED STATES PATENTS

| | | | |
|---|---|---|---|
| 2,220,522 | 11/1940 | Ives. | |
| 2,758,389 | 8/1956 | Kelley | 34—242 X |
| 2,951,353 | 9/1960 | Morrison | 62—63 X |
| 3,032,890 | 5/1962 | Brick et al. | 34—242 X |
| 3,090,134 | 5/1963 | Morrison | 34—242 |

ROBERT A. O'LEARY, *Primary Examiner.*

W. E. WAYNER, *Assistant Examiner.*